US012540608B2

(12) United States Patent
Uckermark et al.

(10) Patent No.: US 12,540,608 B2
(45) Date of Patent: Feb. 3, 2026

(54) FUEL PUMP AND DAMPER CUP THEREOF

(71) Applicant: DELPHI TECHNOLOGIES IP LIMITED, St. Michael (BB)

(72) Inventors: Chad E. Uckermark, Warwick, NY (US); Youssef Kazour, Pittsford, NY (US); John R. Grein, Holley, NY (US)

(73) Assignee: PHINIA Jersey Holdings LLC, Wilmington, DE (US)

( * ) Notice: Subject to any disclaimer, the term of this patent is extended or adjusted under 35 U.S.C. 154(b) by 324 days.

(21) Appl. No.: 17/182,307

(22) Filed: Feb. 23, 2021

(65) Prior Publication Data

US 2022/0268265 A1 Aug. 25, 2022

(51) Int. Cl.
*F04B 39/00* (2006.01)
*F02B 33/28* (2006.01)

(52) U.S. Cl.
CPC .......... *F04B 39/0027* (2013.01); *F02B 33/28* (2013.01)

(58) Field of Classification Search
CPC .............................. F04B 39/0027; F02B 33/28
USPC .............................................. 417/540
See application file for complete search history.

(56) References Cited

U.S. PATENT DOCUMENTS 7,124,738 B2 * 10/2006 Usui .................. F04B 11/0016 123/446
8,317,501 B2 * 11/2012 Inoue ..................... F04B 37/12 417/543
8,662,868 B2 * 3/2014 Oikawa .................. F04B 37/12 417/540
8,727,752 B2 * 5/2014 Lucas .................... B27B 21/04 417/540
9,057,348 B2 * 6/2015 Usui ...................... F02M 55/04
2008/0056914 A1 * 3/2008 Usui ...................... F02M 55/04 417/307
2008/0289713 A1 * 11/2008 Munakata ........... F02M 59/367 138/30

(Continued)

FOREIGN PATENT DOCUMENTS

DE 102015214812 A1 * 2/2017 ............ F02M 55/04
DE 102015219768 A1 4/2017

(Continued)

OTHER PUBLICATIONS

Machine assisted English translation of DE102016205428A1 obtained from https://patents.google.com/patent on Jun. 22, 2022, 6 pages.

*Primary Examiner* — Kurt Philip Liethen
*Assistant Examiner* — Anthony Donald Taylor, Jr.
(74) *Attorney, Agent, or Firm* — WARNER NORCROSS + JUDD LLP

(57) ABSTRACT

A damper cup houses a pulsation damper of a fuel pump such that the damper cup defines a fuel volume together with a fuel pump housing of the fuel pump. The damper cup includes a sidewall which is annular in shape and which extends along a damper cup axis from a sidewall first end to a sidewall second end. The damper cup also includes an end wall which closes the sidewall second end, wherein the sidewall includes a support shoulder which is transverse to the damper cup axis and which is a segment of an annulus extending uninterrupted about the damper cup axis from a shoulder first end to a shoulder second end such that the shoulder first end and the shoulder second end are separated from each other by a gap which is uninterrupted.

20 Claims, 10 Drawing Sheets

(56) References Cited

U.S. PATENT DOCUMENTS

| | | | | |
|---|---|---|---|---|
| 2011/0110807 | A1* | 5/2011 | Kobayashi | F02M 59/102<br>417/540 |
| 2012/0247591 | A1* | 10/2012 | Kuroyanagi | F02M 59/462<br>137/565.01 |
| 2013/0052064 | A1* | 2/2013 | Oikawa | F04B 11/0016<br>417/540 |
| 2013/0230417 | A1* | 9/2013 | Kobayashi | F04B 7/0015<br>417/395 |
| 2015/0017040 | A1* | 1/2015 | Hishinuma | F02M 59/02<br>417/540 |
| 2016/0169173 | A1* | 6/2016 | Yabuuchi | F02M 59/44<br>92/48 |
| 2016/0298581 | A1* | 10/2016 | Nah | F16L 55/05 |
| 2017/0023165 | A1* | 1/2017 | Fujita | F04B 53/002 |
| 2018/0328322 | A1* | 11/2018 | Kashiwagi | F02M 37/0041 |
| 2018/0328328 | A1* | 11/2018 | Kashiwagi | F02M 55/005 |
| 2019/0024646 | A1* | 1/2019 | Kurt | F16L 55/053 |
| 2019/0085807 | A1* | 3/2019 | Han | F02M 59/46 |
| 2019/0301414 | A1* | 10/2019 | Usui | F02M 59/485 |

FOREIGN PATENT DOCUMENTS

| | | | | |
|---|---|---|---|---|
| DE | 102016205428 | A1 | 10/2017 | |
| JP | 2018071443 | A * | 5/2018 | F02M 59/34 |

* cited by examiner

FUEL PUMP AND DAMPER CUP THEREOF

TECHNICAL FIELD OF INVENTION

The present disclosure relates to a fuel pump which supplies fuel to an internal combustion engine, more particularly to such a fuel pump which includes a pumping plunger which reciprocates in a pumping chamber, and even more particularly to a damper cup which houses a pulsation damper for such a fuel pump.

BACKGROUND OF INVENTION

Fuel systems in modern internal combustion engines fueled by gasoline, particularly for use in the automotive market, employ gasoline direct injection (GDi) where fuel injectors are provided which inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump which typically includes a pumping plunger which is reciprocated by a camshaft of the internal combustion engine. Reciprocation of the pumping plunger further pressurizes the fuel in a pumping chamber of the high-pressure fuel pump in order to be supplied to fuel injectors which inject the fuel directly into the combustion chambers of the internal combustion engine. The high-pressure fuel pump includes an electrically actuated inlet valve which allows fuel to enter the pumping chamber during an intake stroke of the plunger. During a compression stroke of the plunger, the inlet valve is closed, thereby allowing the plunger to decrease the volume of the pumping chamber, consequently pressurizing the fuel. When the fuel reaches a predetermined pressure, an outlet valve is opened under the force of the pressurized fuel and the fuel is communicated to the fuel rail and fuel injectors. In order to vary the pressure generated by the high-pressure fuel pump, the inlet valve can be commanded to remain open for a portion of the compression stroke of the plunger, thereby decreasing the fuel pressure generated by the high-pressure fuel pump in order to accommodate different operating conditions of the internal combustion engine. However, when the inlet valve remains open during a portion of the compression stroke of the plunger, pressure pulsations generated by the plunger can propagate upstream of the spill valve which can have undesirable effects on the low-pressure fuel pump and other components in the fuel system. Consequently, these pressure pulsations need to be attenuated.

In order to mitigate the pressure pulsations, it is known for the high-pressure fuel pump to include a pulsation damper located within a fuel volume which is defined by a damper cup and which is exposed to the pressure pulsations. Known pulsation dampers typically include first and second halves which define a sealed damping volume such that the first and second halves each include a damper wall that is configured to flex in response to pressure pulsations. In order to allow the damper walls to flex in response to the pressure pulsations, it is important that the damper walls be exposed to the fuel within fuel volume, and as a result, the pulsation damper must be suspended in the fuel volume. US Patent Application Publication No. US 2011/0110807 A1 to Kobayashi et al. illustrates using a multi-piece supporting member, separate from the pulsation damper, which is used to suspend the pulsation damper within the fuel volume. This supporting member adds parts to the system, and as a result increases cost, manufacturing time, and complexity. US Patent Application No. US 2008/0289713 A1 to Munakata et al. seeks to simplify suspending the pulsation damper within the fuel volume by providing the damper cup with circumferentially spaced features which engage an outer periphery of the pulsation damper. While the arrangement of Munakata et al. may minimize the number of components in comparison to Kobayashi et al., the arrangement of Munakata et al. raises other issues. First, extreme care must be taken during installation of the pulsation damper within the damper cup because if the pulsation damper is tipped, the outer periphery of the pulsation damper has the potential of dropping beyond the support features of the damper cup, thereby requiring removal and repositioning of the pulsation damper. Second, contact area between the pulsation damper and the support features of the damper cup is minimal, thereby increasing contact stress. This high contact stress, together with vibrations which are experienced during the operational life of the high-pressure fuel pump, can lead to decreased durability.

What is needed is a fuel pump and a damper cup thereof which minimize or eliminate one or more of the shortcomings as set forth above.

SUMMARY OF THE INVENTION

Briefly described, the present disclosure provides a fuel pump including a fuel pump housing with a pumping chamber defined therein; a pumping plunger which reciprocates within a plunger bore along a plunger bore axis such that an intake stroke of the pumping plunger increases volume of the pumping chamber and a compression stroke of the pumping plunger decreases volume of the pumping chamber; a damper cup which defines a fuel volume together with the fuel pump housing, the damper cup having a sidewall which is annular in shape and which extends along a damper cup axis from a sidewall first end to a sidewall second end, the damper cup also having an end wall which closes the sidewall second end, wherein the sidewall incudes a support shoulder which is transverse to the damper cup axis and which is a segment of an annulus extending uninterrupted about the damper cup axis from a shoulder first end to a shoulder second end such that the shoulder first end and the shoulder second end are separated from each other by a gap which is uninterrupted; and a pulsation damper located within the fuel volume and defining a damping volume which is fluidly segregated from the fuel volume, the pulsation damper having at least one damper wall which is flexible in response to pressure pulsations within the fuel volume, wherein an outer periphery of the pulsation damper is supported by the support shoulder.

The present disclosure also provides a damper cup for housing a pulsation damper of a fuel pump, wherein the damper cup defines a fuel volume together with a fuel pump housing of the fuel pump. The damper cup includes a sidewall which is annular in shape and which extends along a damper cup axis from a sidewall first end to a sidewall second end; and an end wall which closes the sidewall second end, wherein the sidewall incudes a support shoulder which is transverse to the damper cup axis and which is a segment of an annulus extending uninterrupted about the damper cup axis from a shoulder first end to a shoulder second end such that the shoulder first end and the shoulder second end are separated from each other by a gap which is uninterrupted.

The fuel pump with damper cup as described herein provides for ease of installation of the pulsation damper into the damper cup while ensuring proper positioning of the pulsation damper. Furthermore, durability is increased by increasing surface area contact between the pulsation damper and the damper cup, thereby minimizing contact stress. Also furthermore, rigidity of the damper cup is increased, thereby minimizing flexing in use which minimizes acoustic noise. Still even furthermore, installation of the damper cup on the fuel pump housing is eased by providing features which ensure proper orientation and which provide increased surface area to press the damper cup onto the fuel pump housing.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This disclosure will be further described with reference to the accompanying drawings in which.

DETAILED DESCRIPTION OF INVENTION

Figure 1:
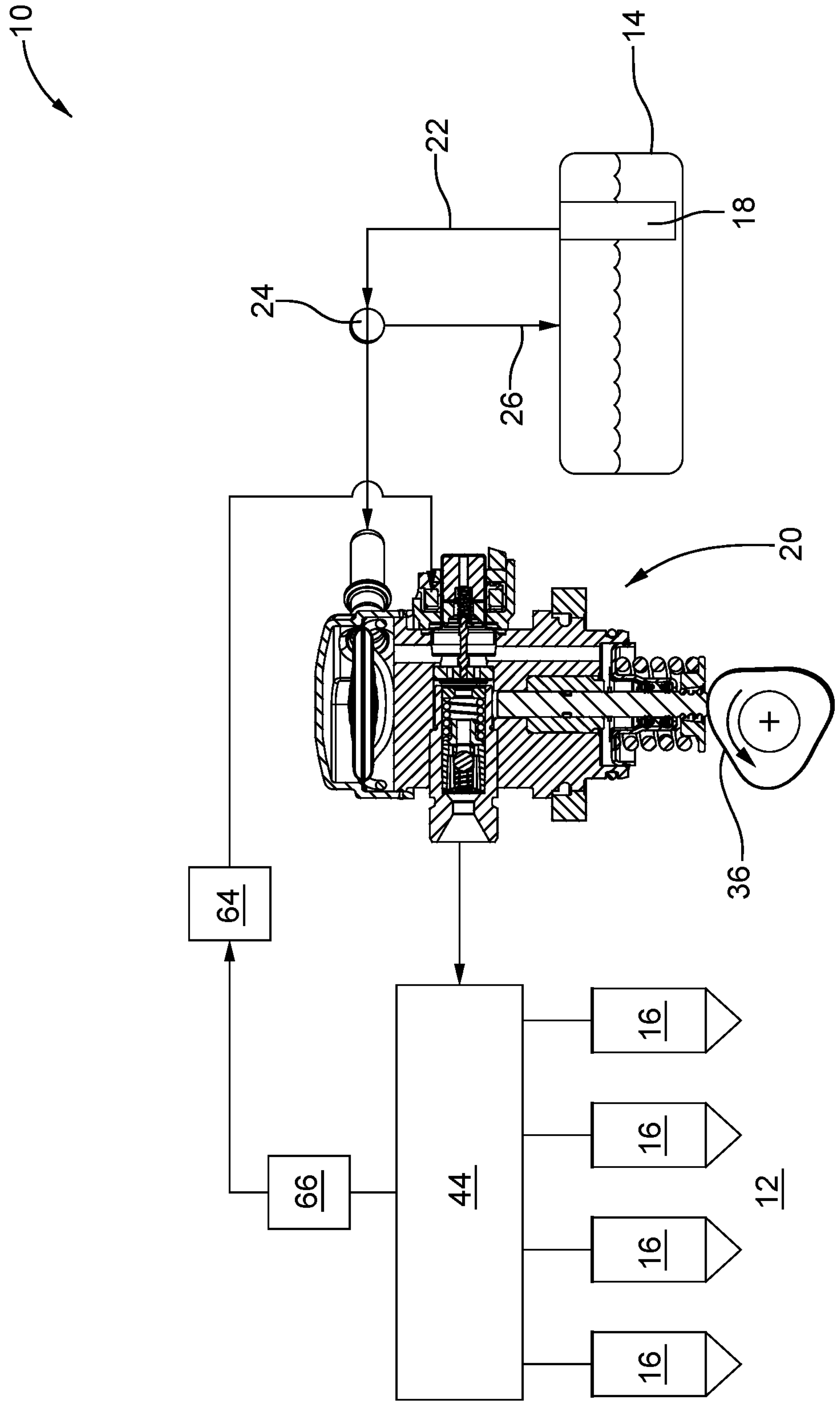
FIG. 1 is a schematic view of a fuel system including a fuel pump in accordance with the present disclosure.

In accordance with a preferred embodiment of this disclosure and referring initially to FIG. 1, a fuel system 10 for an internal combustion engine 12 is shown in schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20 where the low-pressure fuel pump 18 draws fuel from fuel tank 14 and elevates the pressure of the fuel for delivery to high-pressure fuel pump 20 where the high-pressure fuel pump 20 further elevates the pressure of the fuel for delivery to fuel injectors 16. By way of non-limiting example only, low-pressure fuel pump 18 may elevate the pressure of the fuel to about 500 kPa or less and high-pressure fuel pump 20 may elevate the pressure of the fuel to above about 14 MPa and may be about 35 MPa or even higher depending on the operational needs of internal combustion engine 12. While four fuel injectors 16 have been illustrated, it should be understood that a lesser or greater number of fuel injectors 16 may be provided.

As shown, low-pressure fuel pump 18 may be provided within fuel tank 14, however low-pressure fuel pump 18 may alternatively be provided outside of fuel tank 14. Low-pressure fuel pump 18 may be an electric fuel pump as are well known to a practitioner of ordinary skill in the art. A low-pressure fuel supply passage 22 provides fluid communication from low-pressure fuel pump 18 to high-pressure fuel pump 20. A fuel pressure regulator 24 may be provided such that fuel pressure regulator 24 maintains a substantially uniform pressure within low-pressure fuel supply passage 22 by returning a portion of the fuel supplied by low-pressure fuel pump 18 to fuel tank 14 through a fuel return passage 26. While fuel pressure regulator 24 has been illustrated in low-pressure fuel supply passage 22 outside of fuel tank 14, it should be understood that fuel pressure regulator 24 may be located within fuel tank 14 and may be integrated with low-pressure fuel pump 18.

Figure 2:
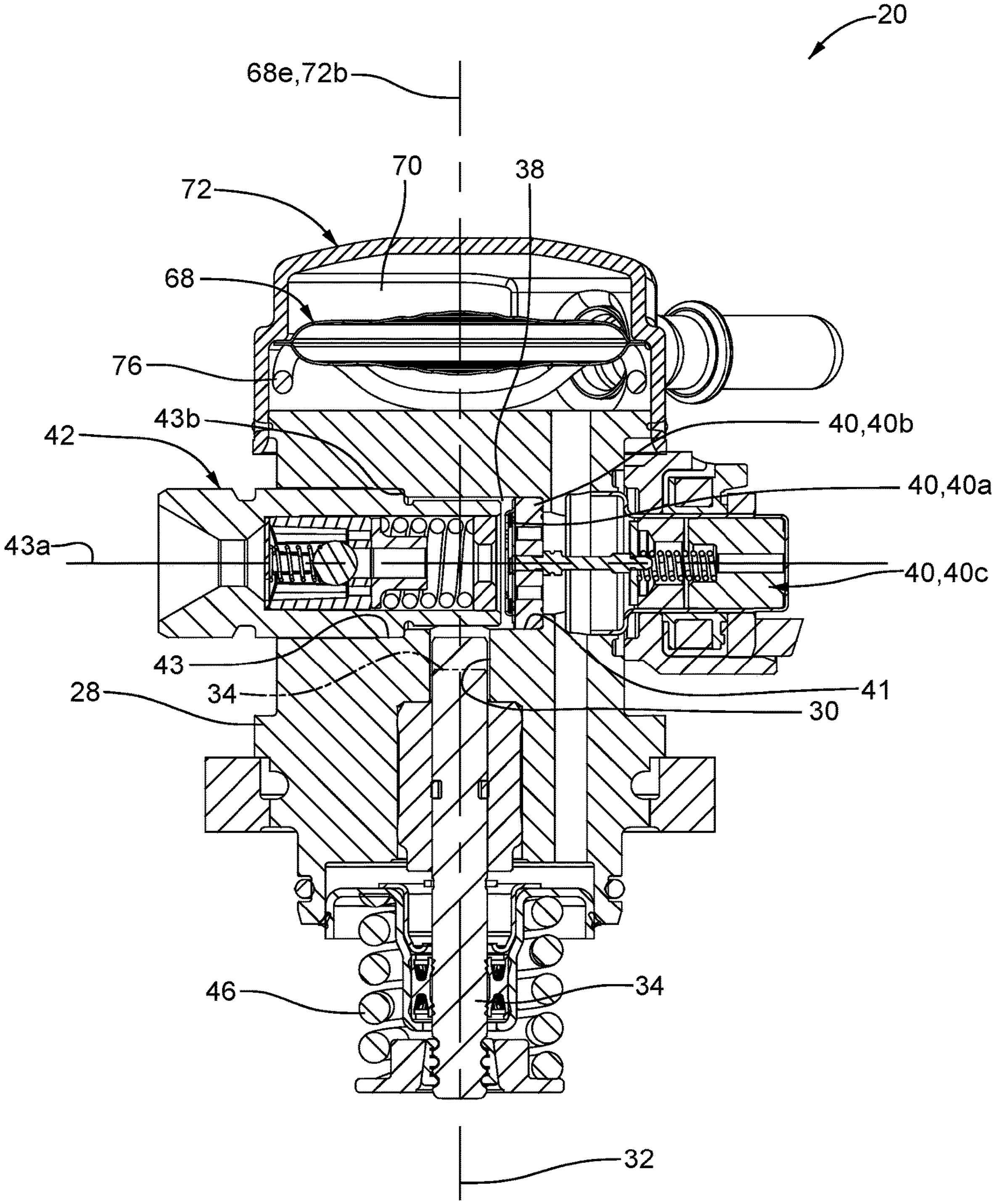
FIG. 2 is an enlarged cross-sectional view of the fuel pump of FIG. 1.

Now with additional reference to FIG. 2, high-pressure fuel pump 20 includes a fuel pump housing 28 which includes a plunger bore 30 which extends along, and is centered about, a plunger bore axis 32. As shown, plunger bore 30 may be defined by a combination of an insert and directly by fuel pump housing 28 but may alternatively be formed only, and directly by, fuel pump housing 28. High-pressure fuel pump 20 also includes a pumping plunger 34 which is located within plunger bore 30 and reciprocates within plunger bore 30 along plunger bore axis 32 based on input from a rotating camshaft 36 of internal combustion engine 12 (shown only in FIG. 1). A pumping chamber 38 is defined within fuel pump housing 28. An inlet valve assembly 40 of high-pressure fuel pump 20 is located within a pump housing inlet passage 41 of fuel pump housing 28 and selectively allows fuel from low-pressure fuel pump 18 to enter pumping chamber 38 while an outlet and pressure relief valve assembly 42 is located within an outlet valve bore 43 of fuel pump housing 28 and selectively allows fuel to be communicated from pumping chamber 38 to fuel injectors 16 via a fuel rail 44 to which each fuel injector 16 is in fluid communication. Outlet and pressure relief valve assembly 42 also provides a fluid path back to pumping chamber 38 if the pressure downstream of outlet and pressure relief valve assembly 42, i.e. between outlet and pressure relief valve assembly 42 and fuel injectors 16, reaches a predetermined limit which may pose an unsafe operating condition if left unmitigated. Outlet valve bore 43 is centered about, and extends along, an outlet valve bore axis 43*a*. In operation, reciprocation of pumping plunger 34 causes the volume of pumping chamber 38 to increase during an intake stroke of pumping plunger 34 (downward as oriented in FIG. 2) in which a plunger return spring 46 causes pumping plunger 34 to move downward, and conversely, the volume of pumping chamber 38 decreases during a compression stroke (upward as oriented in FIG. 2) in which camshaft 36 causes pumping plunger 34 to move upward against the force of plunger return spring 46. In this way, fuel is drawn into pumping chamber 38 during the intake stroke, and conversely, fuel is pressurized within pumping chamber 38 by pumping plunger 34 during the compression stroke, depending on the state of operation of inlet valve assembly 40 as will be described in greater detail later, and discharged through outlet and pressure relief valve assembly 42 under pressure to fuel rail 44 and fuel injectors 16. For clarity, a portion of pumping plunger 34 is shown in phantom lines in FIG. 2 to represent the intake stroke at a bottom dead center position (volume of pumping chamber 38 is maximized) and pumping plunger 34 is shown in solid lines in FIG. 2 to represent the compression stroke at a top dead center position (volume of pumping chamber 38 is minimized) such that pumping plunger 34 reciprocates between the bottom dead center position and the top dead center position.

Outlet and pressure relief valve assembly 42 will now be discussed with continued reference to FIGS. 1 and 2 and additionally with particular reference to FIGS. 3-7. Outlet and pressure relief valve assembly 42 generally includes a valve housing 48 which is tubular and extends along outlet valve bore axis 43*a* from an inner end 48*a*, which is proximal to pumping chamber 38, to an outer end 48*b*, which is distal from pumping chamber 38 and outside of fuel pump housing 28. A valve housing bore 48*c* extends into valve housing 48 from inner end 48*a* along outlet valve bore axis 43*a* such that valve housing bore 48*c* is centered about outlet valve bore axis 43*a*. Valve housing bore 48*c* extends from inner end 48*a* to a shoulder 48*d* which is transverse to outlet valve bore axis 43*a* and which faces toward inner end 48*a*. A valve housing outlet passage 48*e* extends from shoulder 48*d* to outer end 48*b* such that valve housing outlet passage 48*e* provides fluid communication from valve housing bore 48*c* to outer end 48*b*. The inner periphery of valve housing bore 48*c* and valve housing outlet passage 48*e* are each surfaces of revolution centered about outlet valve bore axis 43*a*. Similarly, the outer periphery of valve housing 48 is a surface of revolution centered about outlet valve bore axis 43*a*. Furthermore, the outer periphery of valve housing 48 includes an external shoulder 48*f* which is annular in shape and which is transverse to outlet valve bore axis 43*a* such that external shoulder 48*f* engages a complementary internal shoulder 43*b* of outlet valve bore 43, thereby providing a stop to establish a position of outlet and pressure relief valve assembly 42 within outlet valve bore 43.

Outlet and pressure relief valve assembly 42 also includes a valve seat 50 which is located within valve housing bore 48*c* and is positioned either directly or indirectly by shoulder 48*d*. As illustrated herein, shoulder 48*d* indirectly positions valve seat 50 because an intermediate element, which will be described later, is disposed between valve seat 50 and shoulder 48*d* such that the intermediate member acts as an extension of shoulder 48*d* to provide a positive stop for valve seat 50, however, it is anticipated that valve seat 50 could alternatively directly contact shoulder 48*d*. Valve seat 50 includes a valve seat end wall 50*a* which is transverse to outlet valve bore axis 43*a*. Valve seat 50 also includes a valve seat sidewall 50*b* which is annular in shape and which extends away from valve seat end wall 50*a* such that valve seat sidewall 50*b* spaces valve seat end wall 50*a* away from shoulder 48*d*. An outlet flow passage 50*c* extends through valve seat end wall 50*a* such that outlet flow passage 50*c* is centered about outlet valve bore axis 43*a* and such that outlet flow passage 50*c* provides a path for fuel through valve seat end wall 50*a* when fuel flows from inner end 48*a* to outer end 48*b* in order to communicate pressurized fuel from pumping chamber 38 to fuel injectors 16. Furthermore, one or more pressure relief flow passages 50*d* extend through valve seat end wall 50*a* such that each pressure relief flow passage 50*d* is laterally spaced from outlet flow passage 50*c* relative to outlet valve bore axis 43*a*. In this way, pressure relief flow passages 50*d* are arranged in a polar array which is centered about outlet valve bore axis 43*a*. Pressure relief flow passages 50*d* provide a path for fuel through valve seat end wall 50*a* when fuel flows from outer end 48*b* to inner end 48*a* during an over-pressure condition downstream of outlet and pressure relief valve assembly 42. While two pressure relief flow passages 50*d* have been illustrated in the figures, it should be understood that different quantities may be used. The inner periphery of valve seat sidewall 50*b* includes a plurality of circumferentially alternating flow channels 50*e* and valve guides 50*f* such that flow channels 50*e* provide a path for fuel to flow therethrough. Valve seat 50 is sealed to valve housing 48 such that flow is prevented radially between the outer periphery of valve seat 50 and the inner periphery of valve housing bore 48*c*. For example, the outer periphery of valve seat 50 may engage the inner periphery of valve housing bore 48*c* in an interference fit.

Figure 3:
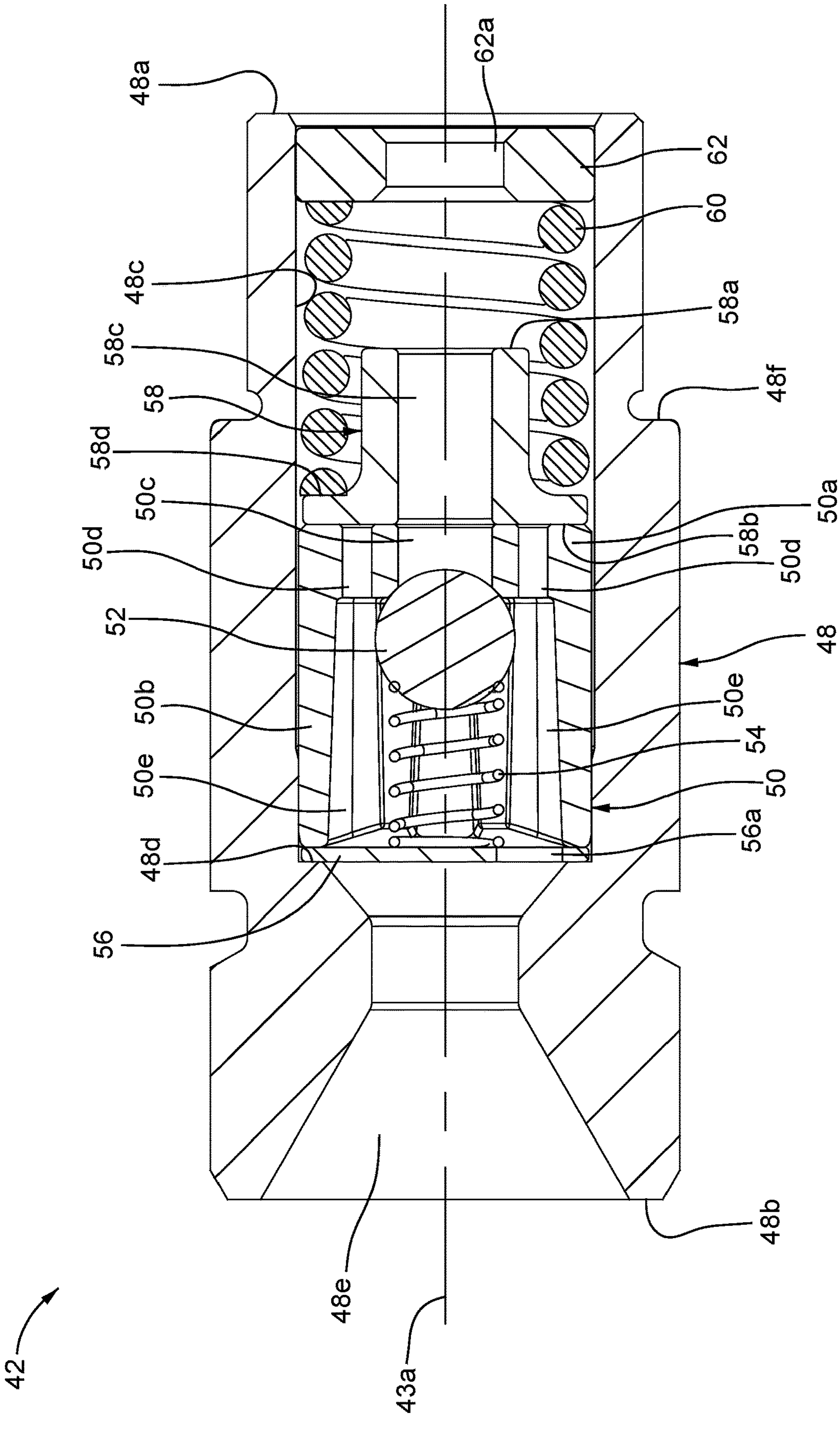
FIG. 3 is a cross-sectional view of an outlet and pressure relief valve assembly of the fuel pump of FIG. 1.
Figure 4:
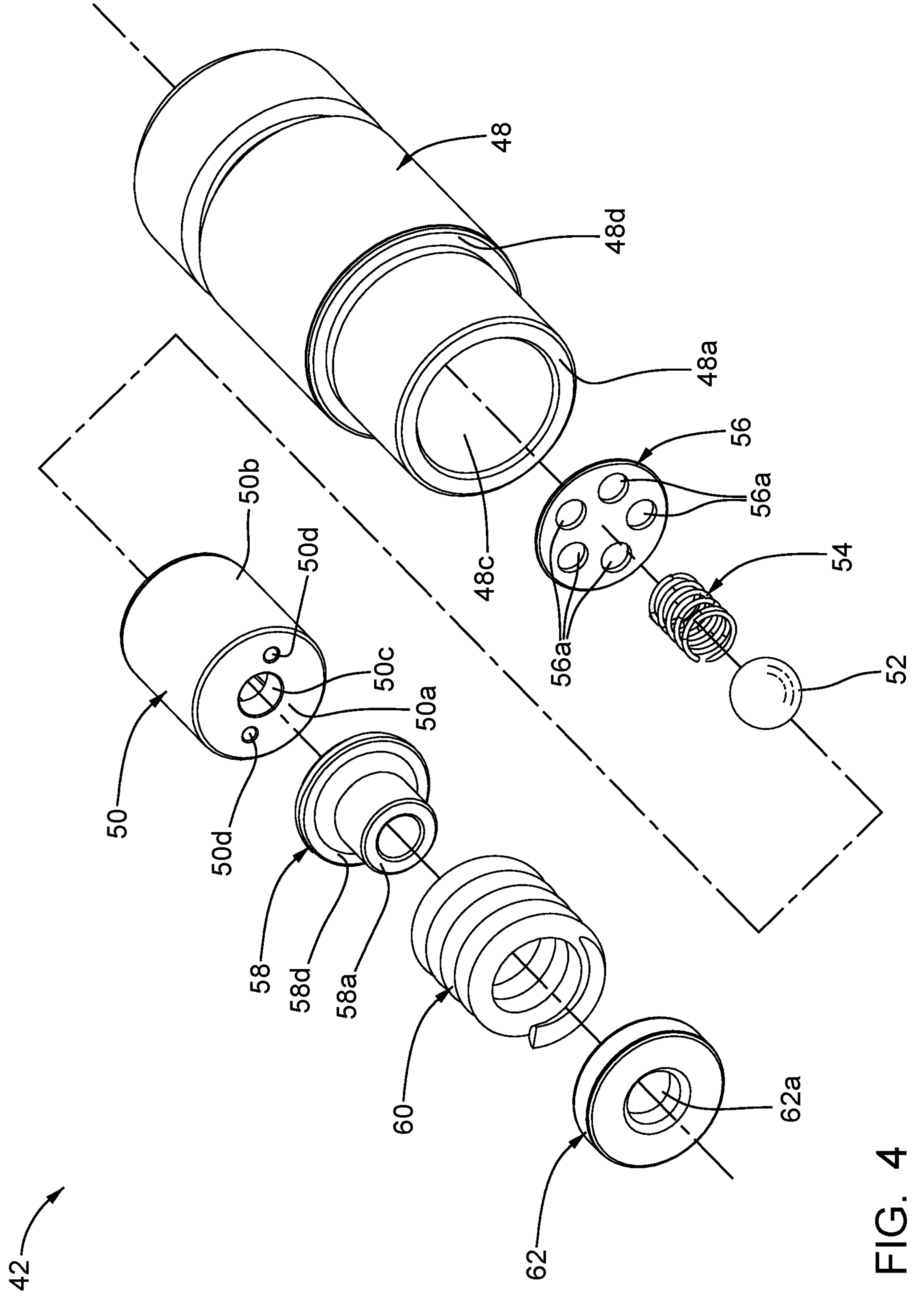
FIGS. 4 and 5 are exploded isometric views of the outlet and pressure relief valve assembly of FIG. 3 taken from different perspectives.
Figure 5:
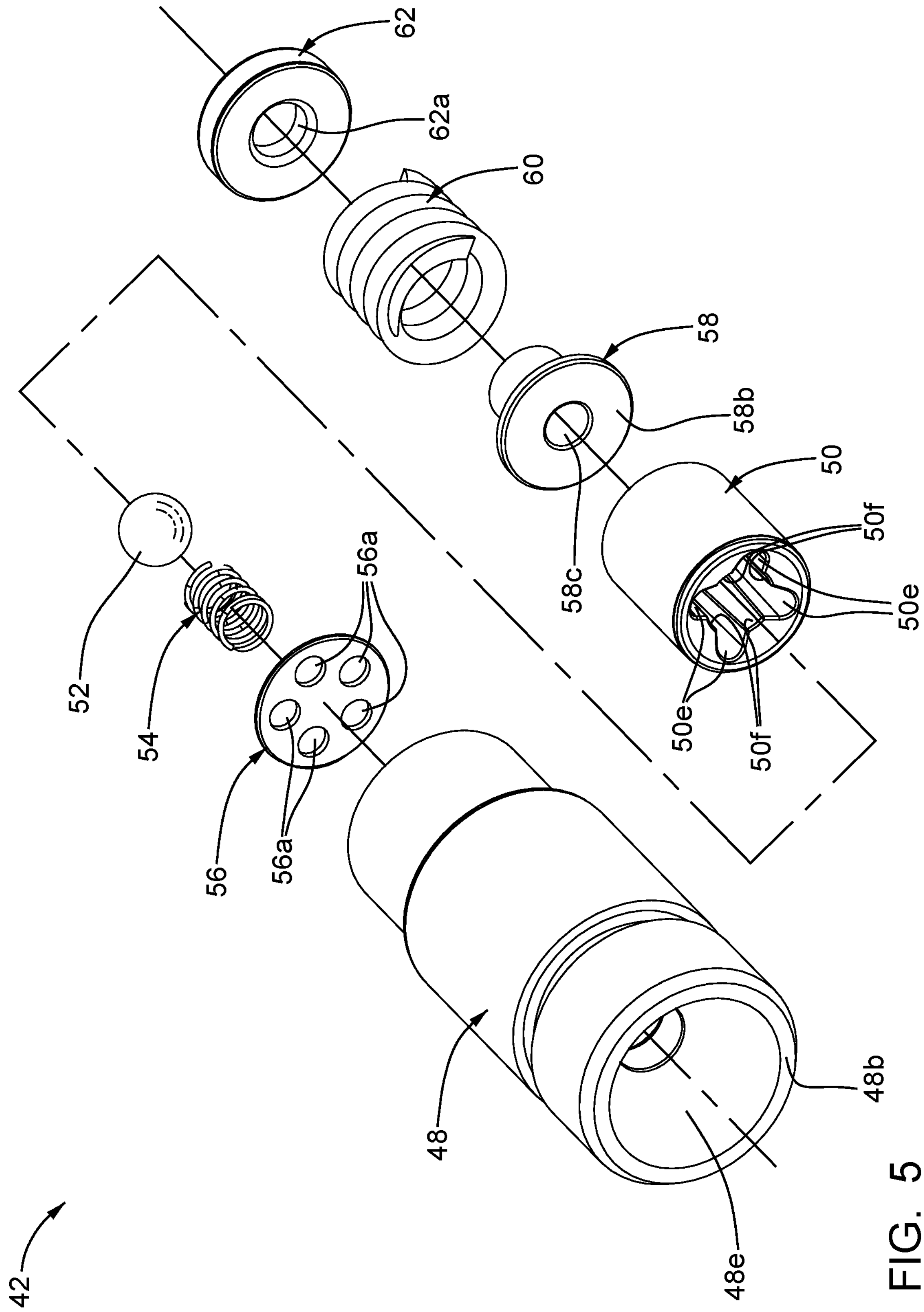
Figure 6:
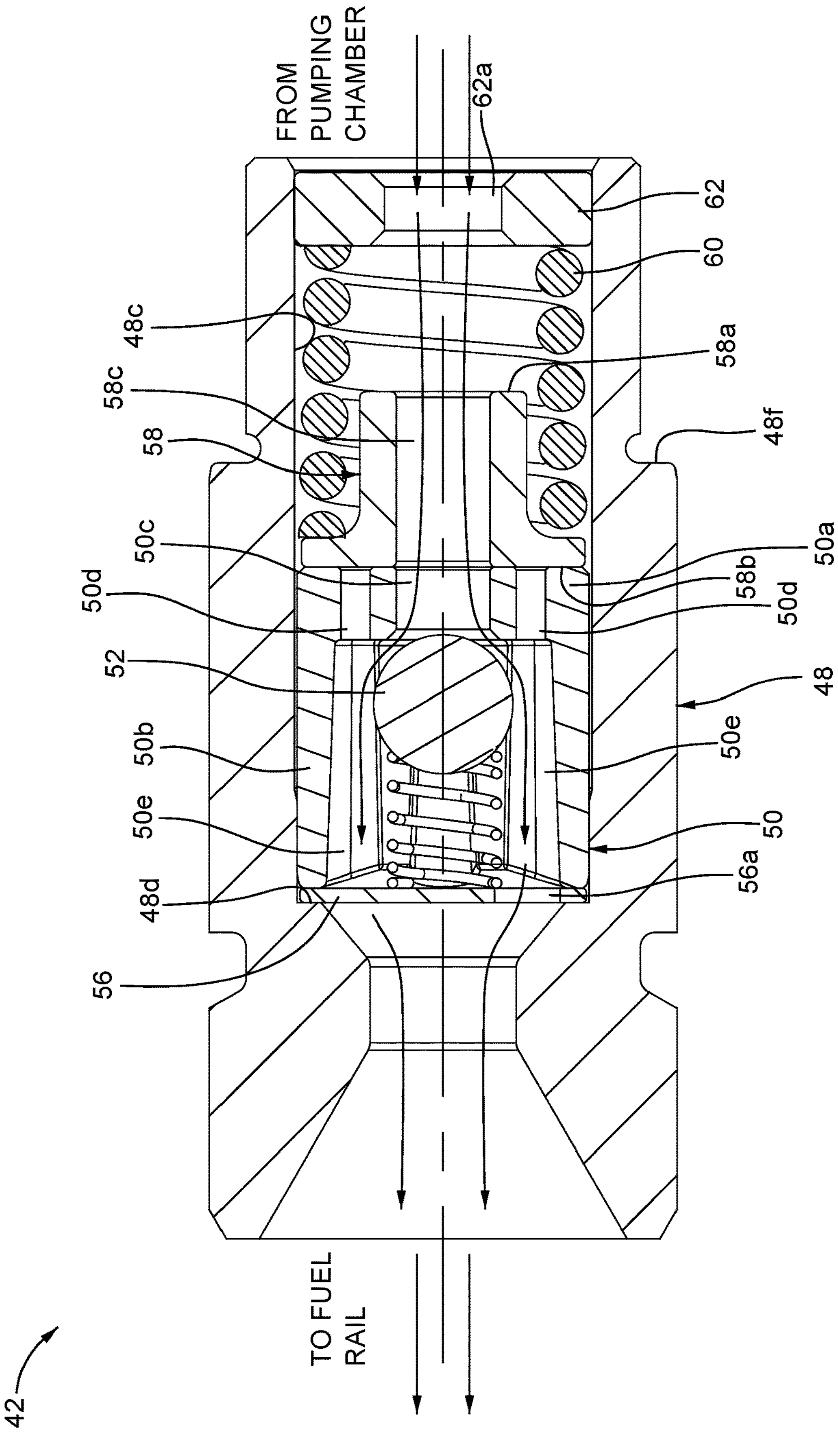
FIG. 6 is the cross-sectional view of FIG. 3 shown with an outlet valve member in an unseated position and arrows to show the path of fuel flow.
Figure 7:
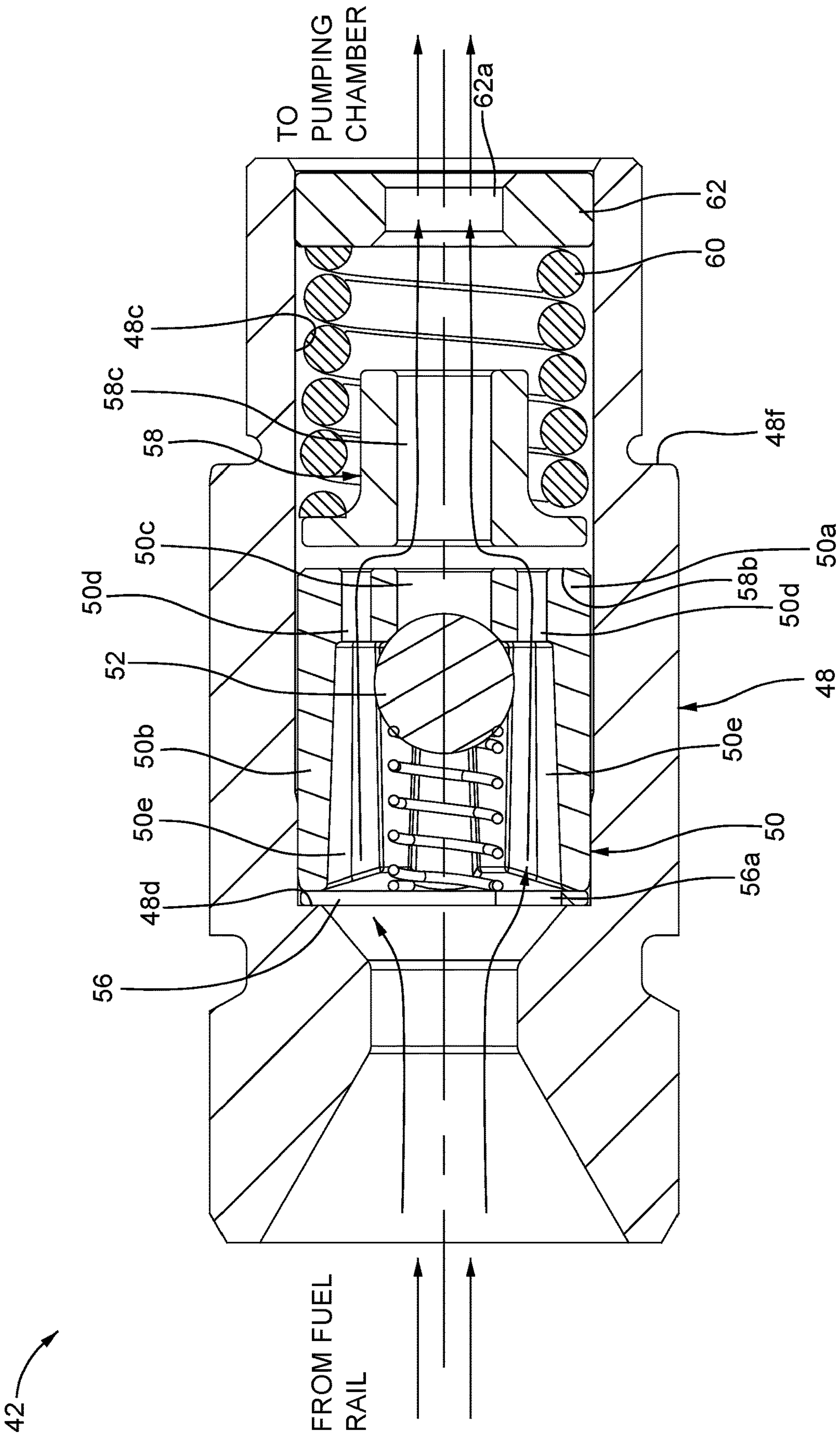
FIG. 7 is the cross-sectional view of FIG. 3 shown with a pressure relief valve member in an unseated position and arrows to show the path of fuel flow.
Figure 8:
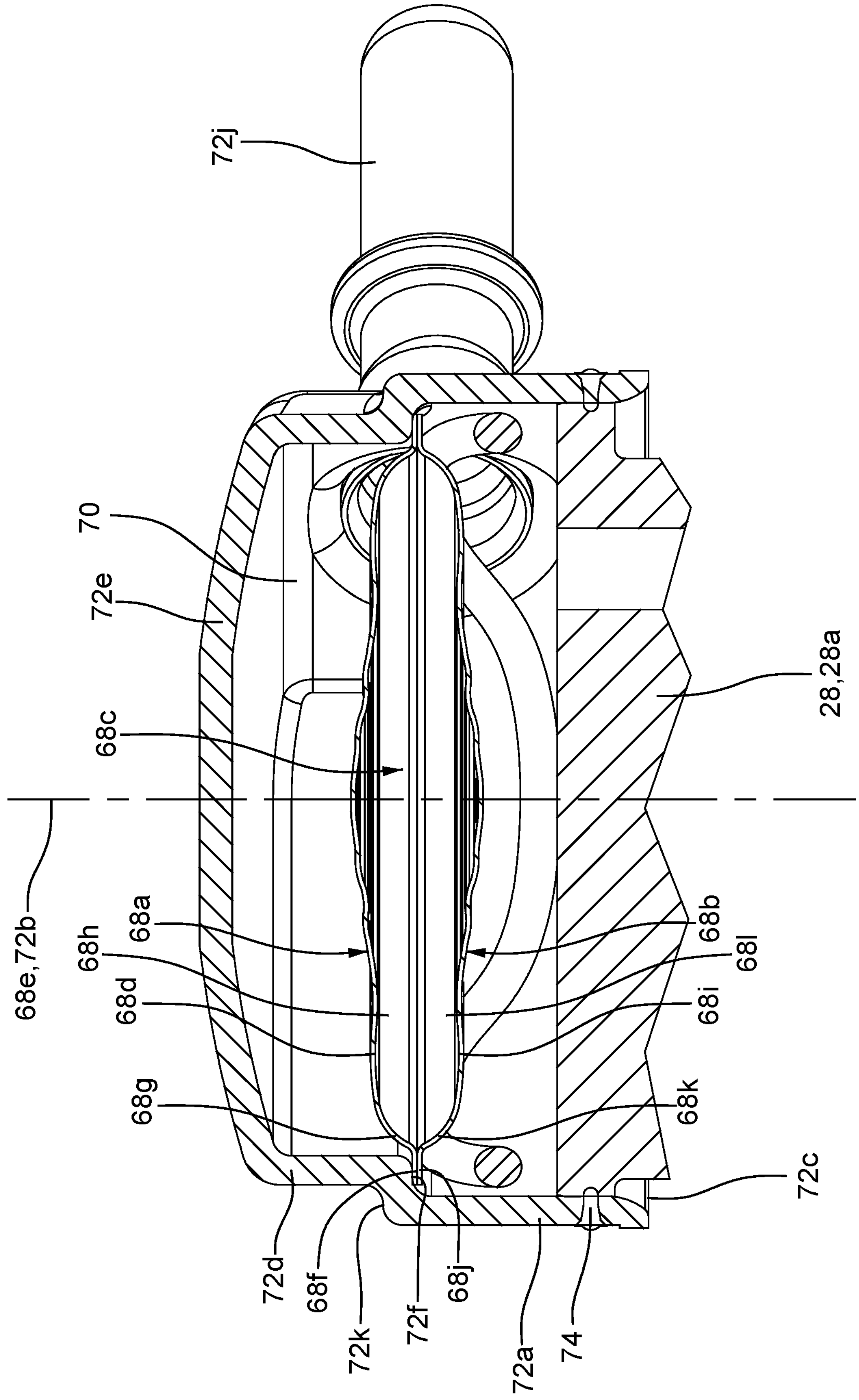
FIG. 8 is an enlarged portion of FIG. 2 showing a pulsation damper and a damper cup of the fuel pump.
Figure 9:
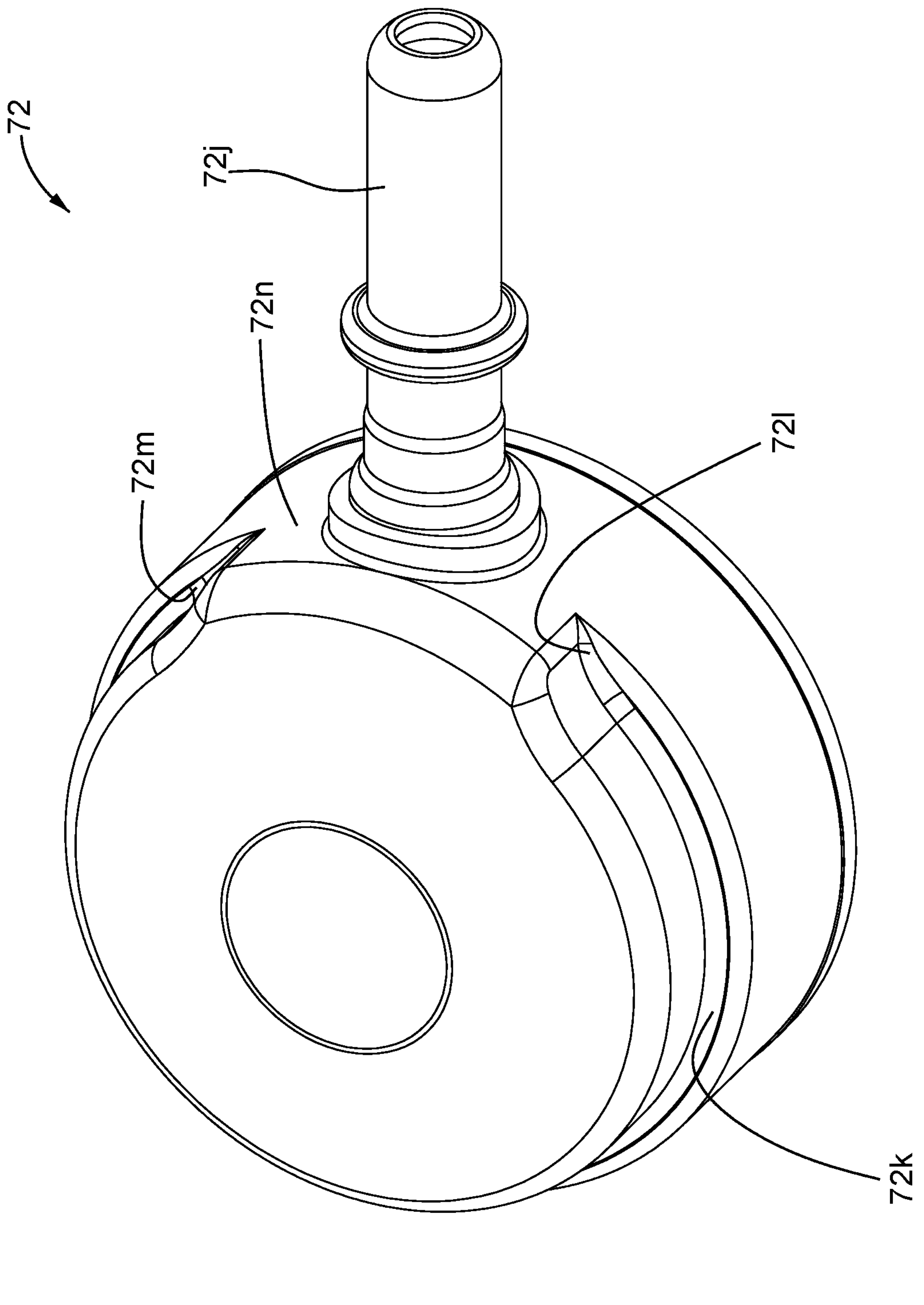
FIG. 9 is an isometric view of the damper cup.
Figure 10:
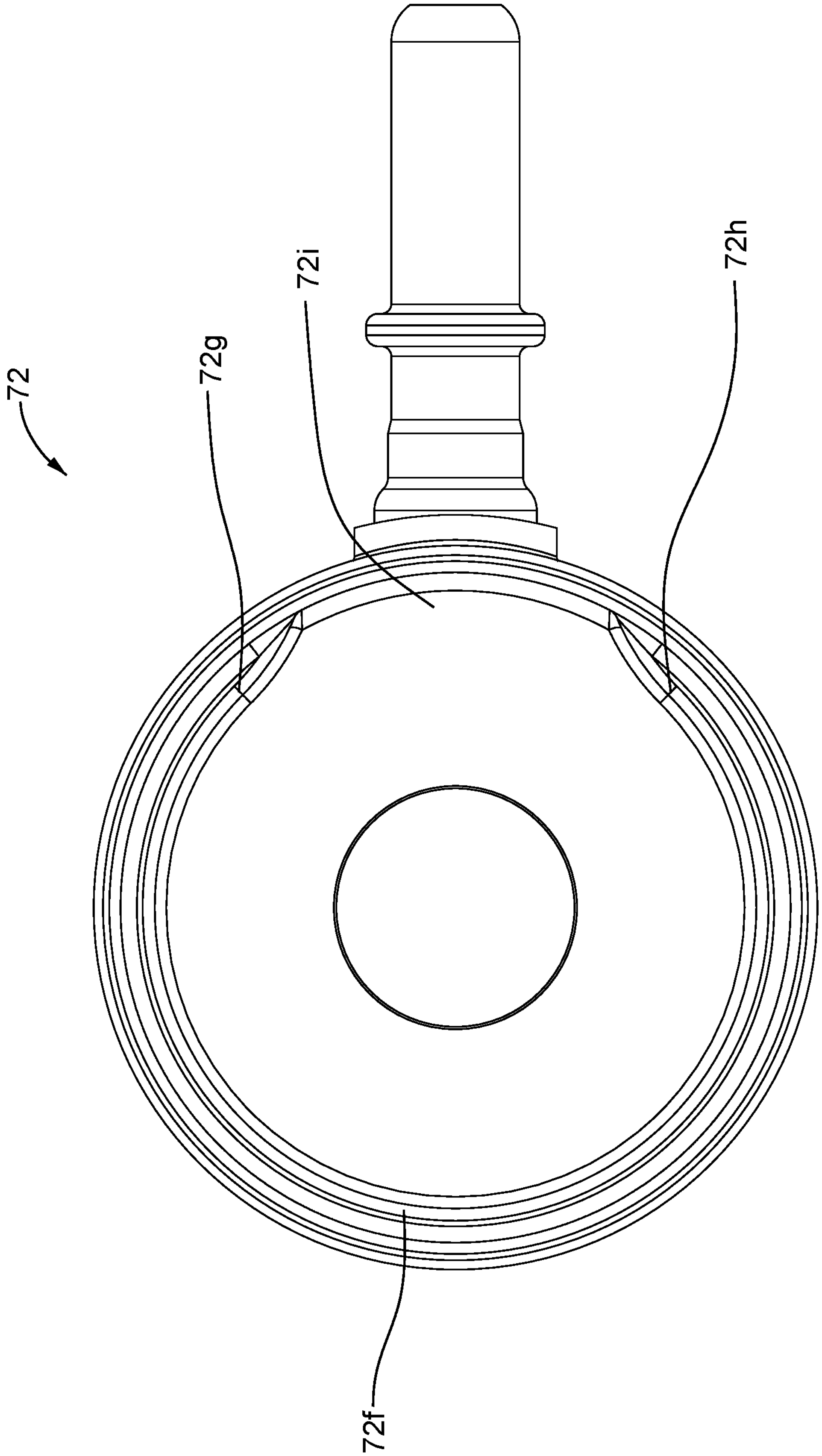
FIG. 10 is an elevation view of the damper cup looking into a fuel volume of the damper cup.

Outlet and pressure relief valve assembly 42 also includes an outlet valve member 52 which is located within valve seat sidewall 50*b* and which is moveable between 1) a seated position, shown in FIGS. 3 and 7, against said valve seat end wall 50*a* which prevents flow through valve housing 48 by way of outlet flow passage 50*c* in a first direction from outer end 48*b* to inner end 48*a* and 2) an unseated position, shown in FIG. 6, spaced apart from valve seat end wall 50*a* which allows flow through valve housing 48 by way of outlet flow passage 50*c* in a second direction from inner end 48*a* to outer end 48*b*. Movement of outlet valve member 52 in a direction laterally relative to outlet valve bore axis 43*a* is limited by valve guides 50*f* while flow channels 50*e* provide a path to flow around outlet valve member 52 when outlet valve member 52 is unseated. As illustrated herein, outlet valve member 52 is spherical. While outlet valve member 52 may be illustrated herein as a full sphere, spherical as used herein includes a portion of a sphere, such as a frustum of a sphere, a spherical cap, or a spherical segment. Alternatively, outlet valve member 52 may be conical or frustoconical. Outlet valve member 52 is biased toward valve seat end wall 50*a* by an outlet valve spring 54 which is grounded to valve housing 48 through an outlet valve spring seat 56 and which is located entirely within valve seat sidewall 50*b*. Outlet valve spring 54 is a coil compression spring and outlet valve spring seat 56 is a disk with one or more outlet valve spring seat apertures 56*a* extending therethrough to allow passage of fuel. Outlet valve spring seat apertures 56*a* are arranged in a polar array centered about outlet valve bore axis 43*a*, thereby allow the central portion of outlet valve spring seat 56 to remain solid to provide a surface for outlet valve spring 54 to engage. While five outlet valve spring seat apertures 56*a* have been illustrated in the figures, it should be understood that different quantities may be used. The outer edge of outlet valve spring seat 56 is captured axially between valve seat sidewall 50*b* and shoulder 48*d* such that outlet valve spring seat 56 engages both valve seat sidewall 50*b* and shoulder 48*d*. Since the outer edge of outlet valve spring seat 56 is captured axially between valve seat sidewall 50*b* and shoulder 48*d* such that outlet valve spring seat 56 engages both valve seat sidewall 50*b* and shoulder 48*d*, shoulder 48*d* indirectly positions valve seat 50 within valve housing bore 48*c*. In this way, valve seat 50 is pressed into place during assembly of outlet and pressure relief valve assembly 42 until it is stopped by shoulder 48*d* and outlet valve spring seat 56.

Outlet and pressure relief valve assembly 42 also includes a pressure relief valve member 58 located within valve housing bore 48*c* between valve seat 50 and inner end 48*a* such that pressure relief valve member 58 is moveable between 1) a seated position, shown in FIGS. 3 and 6, against valve seat end wall 50*a* which prevents flow through valve housing 48 in the second direction from inner end 48*a* to outer end 48*b* by way of pressure relief flow passages 50*d* and 2) an unseated position, shown in FIG. 7, spaced apart from valve seat end wall 50*a* which allows flow through valve housing 48 in the first direction from outer end 48*b* to inner end 48*a* by way of pressure relief flow passages 50*d*.

Pressure relief valve member 58 is centered about outlet valve bore axis 43*a* such that pressure relief valve member 58 extends along outlet valve bore axis 43*a* from a pressure relief valve member inner end 58*a*, which is proximal to inner end 48*a*, to a pressure relief valve member outer end 58*b*, which is distal from inner end 48*a*. A pressure relief valve member outlet flow passage 58*c* extends axially through pressure relief valve member 58 from pressure relief valve member inner end 58*a* to pressure relief valve member outer end 58*b* such that pressure relief valve member outlet flow passage 58*c* provides a path for fuel to flow when outlet valve member 52 is unseated. Pressure relief valve member outlet flow passage 58*c* is centered about outlet valve bore axis 43*a*. The outer periphery of pressure relief valve member 58 is a surface of revolution about outlet valve bore axis 43*a* such that the outer periphery is stepped in diameter, thereby forming a pressure relief valve spring seat 58*d* which is annular in shape and which is transverse to outlet valve bore axis 43*a*, and is preferably perpendicular to outlet valve bore axis 43*a*. Pressure relief valve member outer end 58*b* is annular in shape, is planar, and projects over the entirety of pressure relief flow passages 50*d* such that pressure relief valve member 58 prevents fluid communication through pressure relief flow passages 50*d* when pressure relief valve member 58 is in the seated position.

Outlet and pressure relief valve assembly 42 also includes a pressure relief valve spring 60 which is located within valve housing bore 48*c*. It should be noted that pressure relief valve spring 60 is surrounded directly by valve seat sidewall 50*b*, i.e. there are no intermediate elements located radially between pressure relief valve spring 60 and valve seat sidewall 50*b*, thereby allowing any radial shift of pressure relief valve spring 60 to be controlled directly by valve housing 48. Pressure relief valve spring 60 is a coil compression spring which is held in pression by pressure relief valve spring seat 58*d* and a pressure relief valve spring retainer 62. Pressure relief valve spring retainer 62 is located within valve housing bore 48*c* and is annular in shape such that a pressure relief valve spring retainer outlet passage 62*a* extends axially, i.e. along outlet valve bore axis 43*a*, through pressure relief valve spring retainer 62, thereby providing a path for fuel to flow when outlet valve member 52 is unseated. Pressure relief valve spring retainer outlet passage 62*a* is centered about outlet valve bore axis 43*a*. The outer periphery of pressure relief valve spring retainer 62 is engaged with the inner periphery of valve housing bore 48*c* and during assembly of outlet and pressure relief valve assembly 42, pressure relief valve spring retainer 62 is pressed into valve housing bore 48*c* until a predetermined compression force, within an acceptable tolerance range, of pressure relief valve spring 60 is achieved. In this way, pressure relief valve member 58 is unseated from valve seat 50 when a predetermined pressure downstream of outlet and pressure relief valve assembly 42 occurs.

Inlet valve assembly 40 will now be described with particular reference to FIG. 2. Inlet valve assembly 40 generally includes an inlet valve member 40*a*, an inlet valve seat 40*b*, and a solenoid assembly 40*c*. Inlet valve member 40*a* and inlet valve seat 40*b* act together as a check valve which normally allows fuel to flow into pumping chamber 38 from pump housing inlet passage 41 when pumping plunger 34 is moving to expand the volume of pumping chamber 38, i.e. moving downward as oriented in the figures during the intake stroke, but prevents fuel from flowing from pumping chamber 38 to pump housing inlet passage 41 when pumping plunger 34 is moving to decrease the volume of pumping chamber 38, i.e. upward as oriented during the compression stroke. However, an electronic control unit 64, in conjunction with feedback from a pressure sensor 66 which senses pressure within fuel rail 44, may be used to time the supply of an electric current to solenoid assembly 40*c* during the compression stroke, thereby varying the proportion of fuel from the compression stroke that is supplied to fuel injectors 16 and the proportion of fuel from the compression stroke that is spilled back to pump housing inlet passage 41. When an electric current is supplied to solenoid assembly 40*c*, inlet valve member 40*a* and inlet valve seat 40*b* act together as a check valve, i.e. fuel can flow into pumping chamber 38 through inlet valve assembly 40 but fuel cannot flow out of pumping chamber 38 through inlet valve assembly 40. Conversely, when no electric current is supplied to solenoid assembly 40*c*, inlet valve member 40*a* is held open, thereby allowing fuel to flow back to pump housing inlet passage 41 during a portion of the compression stroke, thereby allowing for the appropriate pressure and volume of fuel to be provided to fuel injectors 16. Inlet valve assembly 40 will not be describe further herein, however, further details may be found in United States Patent Application Publication No. US 2020/0011279 A1 to Dauer et al., the disclosure of which is hereby incorporated by reference in its entirety.

In operation, and with particular reference to FIGS. 2 and 6, when inlet valve assembly 40 is closed and pumping plunger 34 is in the compression stroke, pressure within pumping chamber 38 is elevated, thereby resulting in a force sufficient to cause outlet valve member 52 to unseat from valve seat end wall 50*a*. Consequently, outlet flow passage 50*c* is opened, thereby allowing fuel to flow from pumping chamber 38 to fuel injectors 16. It should be noted that the coaxial nature of pressure relief valve spring retainer outlet passage 62*a*, pressure relief valve member outlet flow passage 58*c*, and outlet flow passage 50*c* provides an unobstructed passage, in a direction parallel to outlet valve bore axis 43*a*, from inner end 48*a* to outlet valve member 52. As a result, the fuel passing through pressure relief valve assembly 42 from pumping chamber 38 to fuel injectors 16 departs from linear flow to flow around outlet valve member 52, however, the spherical nature of outlet valve member 52 provides for a smooth transition, thereby minimizing restriction to the outlet flow of fuel. It should also be noted that outlet valve member 52 is located entirely within fuel pump housing 28 which minimizes transmission of audible noise which may otherwise be transmitted to an operator of a motor vehicle containing internal combustion engine 12. Furthermore, valve housing 48 extends into pumping chamber 38 such that a portion of valve housing 48 is aligned with pumping plunger 34 in a direction parallel to plunger bore axis 32. This relationship minimizes the volume of pumping chamber 38 which is formed larger than necessary in order to accommodate installation of inlet valve seat 40*b*. If pumping chamber 38 is too large in volume, pumping efficiency can be reduced.

In operation, and with particular reference to FIGS. 2 and 7, if the pressure downstream of pressure relief valve assembly 42 exceeds a predetermined threshold, the force of pressure relief valve spring 60 is overcome, thereby allowing pressure relief valve member 58 to unseat from valve seat end wall 50*a*. Consequently, pressure relief flow passages 50*d* are opened, thereby allowing fuel pressure to be relieved back to pumping chamber 38, thereby mitigating the over-pressure condition downstream of pressure relief valve assembly 42. While pressure relief valve member 58 should rarely, if ever, open during the life of high-pressure fuel pump 20, it should be noted that pressure relief valve member 58 is located entirely within fuel pump housing 28 which minimizes transmission of audible noise which may otherwise be transmitted to an operator of a motor vehicle containing internal combustion engine 12. It should also be noted that the planar mating nature of pressure relief valve assembly 42 and valve seat end wall 50*a*, which may be more likely to produce noise, is more easily tolerated applied to the pressure relief function because of its low use over its lifetime.

When inlet valve member 40*a* is held open during a portion of the compression stroke, thereby allowing fuel to flow back to pump housing inlet passage 41, pressure pulsations may be generated within high-pressure fuel pump 20. If left unmitigated, these pressure pulsations may propagate upstream from inlet valve assembly 40 and cause undesirable effects on low-pressure fuel pump 18 and other components in fuel system 10 as well as producing undesirable audible noise. In order to mitigate these pressure pulsations, and now with particular reference to FIGS. 2 and 8-10, high-pressure fuel pump 20 includes a pulsation damper 68 located within a fuel volume 70 defined by a damper cup 72 and by fuel pump housing 28 such that fuel volume 70 is in fluid communication with inlet valve assembly 40 and is also in fluid communication with pumping chamber 38 when inlet valve assembly 40 is open. In the paragraphs that follow, pulsation damper 68 and damper cup 72 will be described in greater detail.

Pulsation damper 68 is a two-piece assembly comprising a pulsation damper first half 68*a* and a pulsation damper second half 68*b* which are sealingly joined together to define a damping volume 68*c* between pulsation damper first half 68*a* and pulsation damper second half 68*b*. Pulsation damper first half 68*a* is defined by first damper wall 68*d* which is flexible in response to the pressure pulsations within fuel volume 70 such that first damper wall 68*d* is centered about a damper axis 68*e*. Pulsation damper first half 68*a* is also defined by a first attachment flange 68*f* which is spaced axially from first damper wall 68*d* such that a first connecting wall 68*g* joins first damper wall 68*d* and first attachment flange 68*f*, consequently, pulsation damper first half 68*a* defines a first recess 68*h*. First attachment flange 68*f* is substantially planar and may be annular in shape. Similarly, pulsation damper second half 68*b* is defined by a second damper wall 68*i* which is flexible in response to the pressure pulsations within fuel volume 70 such that second damper wall 68*i* is centered about damper axis 68*e*. Pulsation damper second half 68*b* is also defined by a second attachment flange 68*j* which is spaced axially from second damper wall 68*i* such that a second connecting wall 68*k* joins second damper wall 68*i* and second attachment flange 68*j*, consequently, pulsation damper second half 68*b* defines a second recess 68*l*. Second attachment flange 68*j* is substantially planar and may be annular in shape. Pulsation damper first half 68*a* and pulsation damper second half 68*b* sealingly mate together at first attachment flange 68*f* and second attachment flange 68*j* such that first recess 68*h* and second recess 68*l* face each other and together comprise damping volume 68*c*. First attachment flange 68*f* and second attachment flange 68*j* may be sealed together, by way of non-limiting example only, by welding, thereby fluidly segregating damping volume 68*c* from fuel volume 70. Damping volume 68*c* may be filled with ambient air or an inert gas such as pressurized nitrogen or other media which contracts to damp pressure pulsations and then expands when the pressure pulsation subsides. Alternatively, another method may be used such as a spring or foam within damping volume 68*c* in order to provide desirable damping characteristics without permanent deformation.

Damper cup 72 includes a sidewall 72*a* which extends along a damper cup axis 72*b* from a sidewall first end 72*c* to a sidewall second end 72*d* such that sidewall 72*a* is annular in shape. Damper cup 72 also includes an end wall 72*e* which closes sidewall second end 72*d*. Sidewall first end 72*c* is closed by fuel pump housing 28. For example, as illustrated in the figures, fuel pump housing 28 incudes a fuel pump housing extension 28*a* which is cylindrical and which extends into sidewall first end 72*c*. Damper cup 72 is sealingly fixed to fuel pump housing 28, for example by circumferentially welding sidewall 72*a* to fuel pump housing extension 28*a* as indicated by weld 74. Alternatively, or additionally, damper cup 72 may be fixed to fuel pump housing 28 using mechanical fasteners and sealing members such as O-rings or other mechanical seals known to those of ordinary skill in the art.

In order to suspend pulsation damper 68 within fuel volume 70 such that first damper wall 68*d* and second damper wall 68*i* are exposed to the fuel within fuel volume 70, damper cup 72 includes a support shoulder 72*f* within fuel volume 70 upon which first attachment flange 68*f* is supported. Support shoulder 72*f* is transverse to damper cup axis 72*b* and is a segment of an annulus extending uninterrupted about, i.e. around, damper cup axis 72*b* from a shoulder first end 72*g* to a shoulder second end 72*h* such that shoulder first end 72*g* and shoulder second end 72*h* are separated from each other by a gap 72*i* which is uninterrupted. Support shoulder 72*f* extends from shoulder first end 72*g* to shoulder second end 72*h* for an angular distance of 270°±60° around damper cup axis 72*b* with the remainder of the angular distance around damper cup axis 72*b* being provided by gap 72*i*. In other words, the sum of the angular distances about damper cup axis 72*b* of support shoulder 72*f* and gap 72*i* is 360°. Gap 72*i* provides fluid communication around pulsation damper 68 in order to allow both first damper wall 68*d* and second damper wall 68*i* to be exposed to the pressure pulsations during operation.

Damper cup 72 also includes an inlet fitting 72*j* which is connected to low-pressure fuel supply passage 22 down stream of fuel pressure regulator 24. In this way, fuel enters high-pressure fuel pump 20 through inlet fitting 72*j* such that inlet fitting 72*j* provides a fuel inlet into fuel volume 70. Inlet fitting 72*j* is tubular and is connected to sidewall 72*a* such that inlet fitting 72*j* is positioned within gap 72*i*, thereby providing unrestricted passage of fuel. As can be seen in the figures, inlet fitting 72*j* is positioned through sidewall 72*a* such that inlet fitting 72*j* is positioned axially between sidewall first end 72*c* and sidewall second end 72*d* to be aligned with support shoulder 72*f*. Alternatively, but not shown, inlet fitting 72*j* may be connected to end wall 72*e* or may be omitted from damper cup 72 entirely by providing an inlet fitting elsewhere on fuel pump housing 28.

Sidewall 72*a* and end wall 72*e* are formed from a single piece of material through one or more of deep drawing and stamping of a piece of sheet metal.

Consequently, sidewall 72*a* also includes an exterior shoulder 72*k* on the outer periphery thereof which is complementary to support shoulder 72*f* and which is transverse to damper cup axis 72*b*. As a result, exterior shoulder 72*k* extends uninterrupted about damper cup axis 72*b* from an exterior shoulder first end 72*l* to an exterior shoulder second end 72*m* for an angular distance of 270°±60°. As can be seen in the figures, at least a portion of exterior shoulder 72*k* is axially aligned, i.e. in a direction parallel to damper cup axis 72*b*, with sidewall first end 72*c* which allows exterior shoulder 72*k* to be used as a surface to press against when installing damper cup 72 to fuel pump housing extension 28*a*. By having at least a portion of exterior shoulder 72*k* axially aligned with sidewall first end 72*c*, the press force is applied in a straight line through sidewall 72*a*, i.e. there is no bending moment applied. A cylindrical surface segment 72*n* extends from exterior shoulder first end 72*l* and exterior shoulder second end 72*m* such that inlet fitting 72*j* is connected to cylindrical surface segment 72*n* and such that inlet fitting 72*j* is positioned between sidewall first end 72*c* and sidewall second end 72*d* to be aligned with exterior shoulder 72*k*, i.e. inlet fitting 72*j* and exterior shoulder 72*k* are at the same elevation in a direction parallel to damper cup axis 72*b*.

A positioning member, illustrated herein as spring 76, is provided in order to keep first attachment flange 68*f* in contact with support shoulder 72*f*. More specifically, spring 76 has been illustrated herein as a wave spring, however, other resilient and compliant or rigid alternatives are anticipated, for example, coil compression spring or solid spacers. Spring 76 is held in compression against second attachment flange 68*j* and the axial end of fuel pump housing extension 28*a*. Consequently, the position of pulsation damper 68 is maintained within fuel volume 70 which ensures that pulsation damper 68 does not move during operation, regardless of pressure pulsations or vibration forces.

High-pressure fuel pump 20 which includes damper cup 72 provides several advantages over known arrangements. Support shoulder 72*f* extending uninterrupted for an angular distance of 270°±60° around damper cup axis 72*b* with the remainder of the angular distance around damper cup axis 72*b* being provided by gap 72*i* ensures that pulsation damper 68 can be dropped into position without the possibility of being misassembled between discrete support features which are spaced circumferentially as is known in the prior art, thereby acting similar to a manhole cover in that pulsation damper 68 cannot be positioned between support shoulder 72*f* and end wall 72*e* in such a way as to prevent assembly of, or allow improper assembly of, pulsation damper 68 and damper cup 72 with fuel pump housing 28. Support shoulder 72*f* extending uninterrupted for an angular distance of 270°±60° around damper cup axis 72*b* provides increased surface contact between support shoulder 72*f* and pulsation damper 68, thereby minimizing contact stress that could potentially negatively impact durability. The addition of support shoulder 72*f* and exterior shoulder 72*k* also increases the rigidity of damper cup 72, thereby minimizing flexing of damper cup 72 which minimizes audible noise. Furthermore, exterior shoulder 72*k* provides increased surface contact with tooling (not shown) that is used to press damper cup 72 onto fuel pump housing extension 28*a* and allows the force to be transferred straight through sidewall 72*a*. Also furthermore, the tooling used to press damper cup 72 onto fuel pump housing extension 28*a* can be used to orient damper cup 72 with respect to fuel pump housing 28 since the length of exterior shoulder 72*k* ensures a unique orientation which ensures that inlet fitting 72*j* is in the required radial orientation position.

While this invention has been described in terms of preferred embodiments thereof, it is not intended to be so limited, but rather only to the extent set forth in the claims that follow.

We claim:

1. A fuel pump comprising:

a fuel pump housing with a pumping chamber defined therein;

a pumping plunger which reciprocates within a plunger bore along a plunger bore axis such that an intake stroke of said pumping plunger increases volume of said pumping chamber and a compression stroke of said pumping plunger decreases volume of said pumping chamber;

a damper cup which defines an internal fuel volume together with said fuel pump housing, said damper cup having a sidewall which is annular in shape and which extends along a damper cup axis from a sidewall first end to a sidewall second end, said damper cup also having an end wall which closes said sidewall second end, wherein said sidewall includes an interior support shoulder which is transverse to said damper cup axis and which has an inner surface that is one segment of an annulus extending about said damper cup axis from a shoulder inner surface first end to a shoulder inner surface second end such that said shoulder inner surface first end and said shoulder inner surface second end are separated from each other by a single gap, the inner surface of the interior support shoulder being within said fuel volume; and a pulsation damper located within said fuel volume and defining a damping volume which is fluidly segregated from said fuel volume, said pulsation damper having at least one damper wall which is flexible in response to pressure pulsations within said fuel volume, wherein an outer periphery of said pulsation damper is supported by the inner surface of said interior support shoulder.

2. A fuel pump as in claim 1, wherein said interior support shoulder extends around said damper cup axis for an angular distance of 270°±60°.

3. A fuel pump as in claim 1, wherein said damper cup includes an inlet fitting which is tubular and which provides a fuel inlet into said fuel volume, said inlet fitting being positioned through said sidewall such that said inlet fitting is positioned within said gap.

4. A fuel pump as in claim 3, wherein said inlet fitting is positioned between said sidewall first end and said sidewall second end to be aligned with said interior support shoulder.

5. A fuel pump as in claim 1, where said sidewall also includes an exterior shoulder which is transverse to said damper cup axis extending about said damper cup axis from an exterior shoulder first end to an exterior shoulder second end such that said exterior shoulder first end and said exterior shoulder second end are separated from each other by a cylindrical surface segment.

6. A fuel pump as in claim 5, wherein said exterior shoulder extends around said damper cup axis for an angular distance of 270°±60°.

7. A fuel pump as in claim 5, wherein said damper cup includes an inlet fitting which is tubular and which provides a fuel inlet into said fuel volume, said inlet fitting being positioned through said sidewall at said cylindrical surface segment.

8. A fuel pump as in claim 7, wherein said inlet fitting is positioned between said sidewall first end and said sidewall second end to be aligned with said exterior shoulder.

9. A fuel pump as in claim 5, wherein said exterior shoulder is axially aligned with said sidewall first end in a direction parallel to said damper cup axis.

10. A damper cup for housing a pulsation damper of a fuel pump, wherein said damper cup defines an internal fuel volume together with a fuel pump housing of said fuel pump, said damper cup comprising:

a sidewall which is annular in shape and which extends along a damper cup axis from a sidewall first end to a sidewall second end; and an end wall which closes said sidewall second end, wherein said sidewall includes an interior support shoulder which is transverse to said damper cup axis and which is one segment of an annulus extending about said damper cup axis from a shoulder inner surface first end to a shoulder inner surface second end such that said shoulder inner surface first end and said shoulder inner surface second end are separated from each other by a single gap, the inner surface of the interior support shoulder being within said fuel volume.

11. A damper cup as in claim 10, wherein said interior support shoulder extends around said damper cup axis for an angular distance of 270°±60°.

12. A damper cup as in claim 10, wherein said damper cup includes an inlet fitting which is tubular and which provides a fuel inlet into said fuel volume, said inlet fitting being positioned through said sidewall such that said inlet fitting is positioned within said gap.

13. A damper cup as in claim 12, wherein said inlet fitting is positioned axially along said damper cup axis between said sidewall first end and said sidewall second end to be aligned with said interior support shoulder.

14. A damper cup as in claim 10, where said sidewall also includes an exterior shoulder which is transverse to said damper cup axis extending about said damper cup axis from an exterior shoulder first end to an exterior shoulder second end such that said exterior shoulder first end and said exterior shoulder second end are separated from each other by a cylindrical surface segment.

15. A damper cup as in claim 14, wherein said exterior shoulder extends around said damper cup axis for an angular distance of 270°±60°.

16. A damper cup in claim 14, wherein said damper cup includes an inlet fitting which is tubular and which provides a fuel inlet into said fuel volume, said inlet fitting being positioned through said sidewall at said cylindrical surface segment.

17. A damper cup as in claim 16, wherein said inlet fitting is positioned between said sidewall first end and said sidewall second end to be aligned with said exterior shoulder.

18. A damper cup as in claim 14, wherein said exterior shoulder is axially aligned with said sidewall first end in a direction parallel to said damper cup axis.

19. A fuel pump comprising:

a fuel pump housing with a pumping chamber defined therein;

a pumping plunger which reciprocates within a plunger bore along a plunger bore axis such that an intake stroke of said pumping plunger increases volume of said pumping chamber and a compression stroke of said pumping plunger decreases volume of said pumping chamber;

a damper cup which defines an internal fuel volume together with said fuel pump housing, said damper cup having a sidewall which is annular in shape and which extends along a damper cup axis from a sidewall first end to a sidewall second end, said damper cup also having an end wall which closes said sidewall second end, wherein said sidewall includes an interior support shoulder which is transverse to said damper cup axis and which has an inner surface that extends about said damper cup axis from a shoulder inner surface first end to a shoulder inner surface second end such that said shoulder inner surface first end and said shoulder inner surface second end are separated from each other by a single gap which extends from said shoulder inner surface first end to said shoulder inner surface second end; and a pulsation damper located within said fuel volume and defining a damping volume which is fluidly segregated from said fuel volume, said pulsation damper having at least one damper wall which is flexible in response to pressure pulsations within said fuel volume, wherein an outer periphery of said pulsation damper is supported by the inner surface of said interior support shoulder.

20. A fuel pump as in claim 19, wherein a sum of angular distances of said interior support shoulder and said gap, about said damper cup axis, is 360°.

* * * * *